Figure 1:
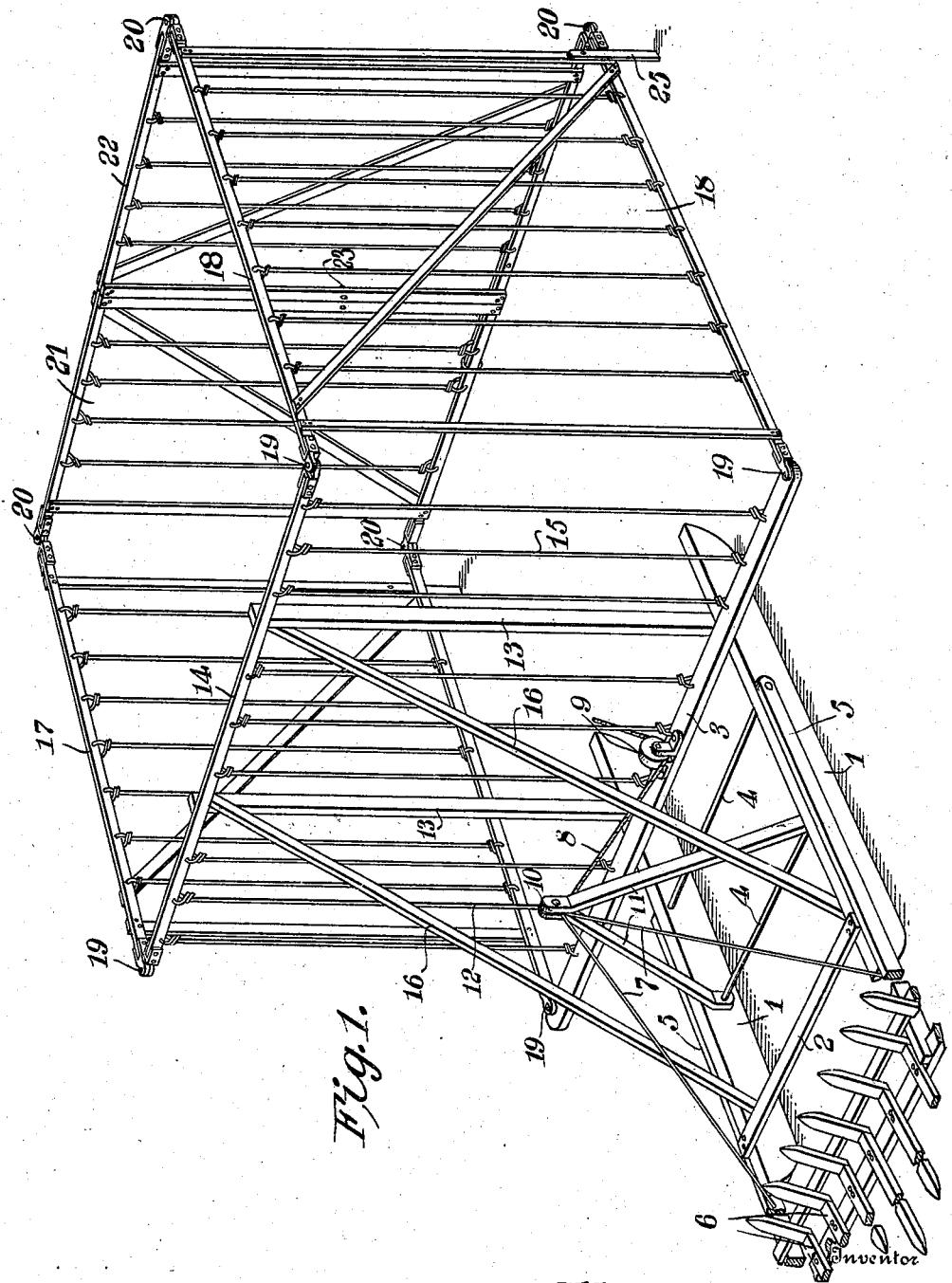

No. 881,705.

PATENTED MAR. 10, 1908.

E. MURRAY.

HAY PITCHING AND STACKING APPARATUS.

APPLICATION FILED DEC. 19, 1907.

2 SHEETS—SHEET 1.

Witnesses
C. E. Smith.
C. C. Hines.

Inventor
Edward Murray.
By Victor J. Evans
Attorney

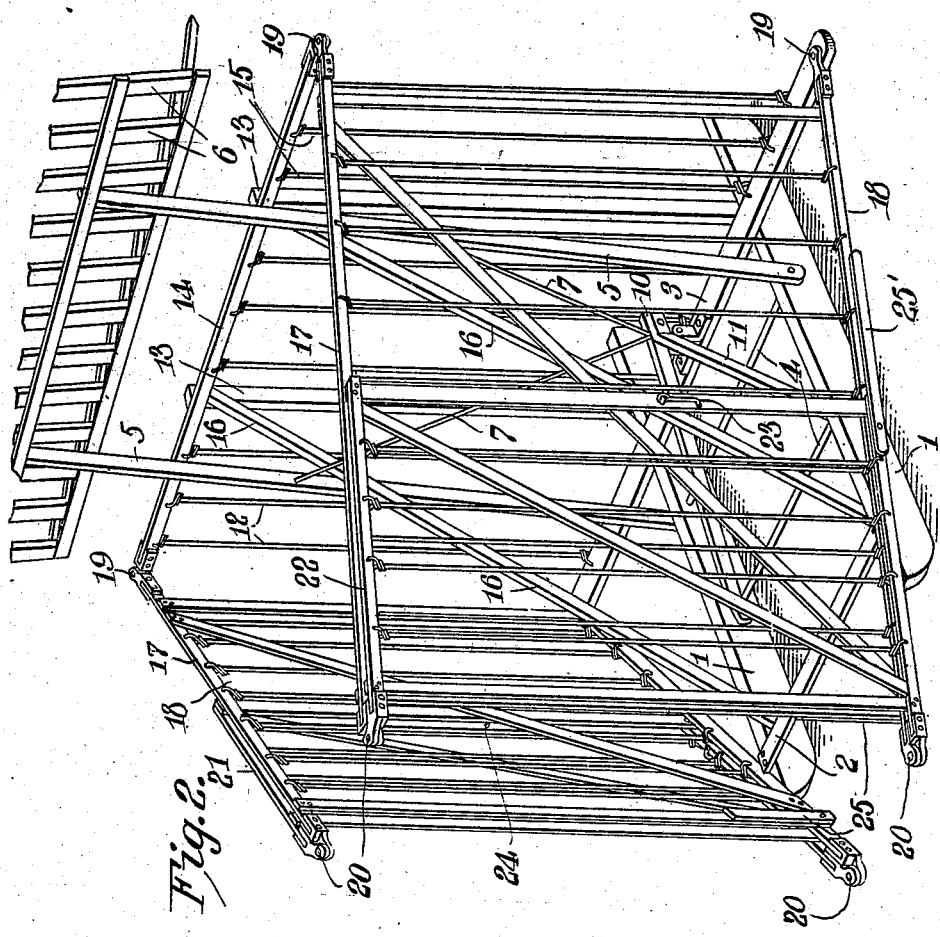

UNITED STATES PATENT OFFICE.

EDWARD MURRAY, OF MULLEN, NEBRASKA.

HAY PITCHING AND STACKING APPARATUS.

No. 881,705.

Specification of Letters Patent.

Patented March 10, 1908.

Application filed December 19, 1907. Serial No. 407,205.

*To all whom it may concern:*

Be it known that I, EDWARD MURRAY, a citizen of the United States, residing at Mullen, in the county of Hooker and State of Nebraska, have invented new and useful Improvements in Hay Pitching and Stacking Apparatus, of which the following is a specification.

This invention relates to improvements in hay pitching and stacking devices of that type designed to be transported from place to place in the field for the purpose of forming the stacks, the primary object of the invention being to provide a simple, efficient and comparatively inexpensive type of apparatus of this kind having a stack-forming frame or inclosure adapted to be conveniently set up for use and folded in close compass upon the frame of the apparatus for the ready transportation of the latter from place to place.

The invention consists of the features of construction, combination and arrangement of parts hereinafter fully described and claimed, reference being had to the accompanying drawings, in which:—

Figure 1 is a perspective view of a hay pitching and stacking machine embodying my invention, showing the machine as arranged for use to form a stack. Fig. 2 is a perspective view showing the machine as arranged for storage or transportation.

Referring now more particularly to the drawings, the numeral 1 designates a pair of skids or runners, connected by front and rear cross-bars 2 and 3 and tie rods or bolts 4, thus forming the base frame of the apparatus, which is adapted to slide over the surface of the ground. I have not shown the draft connections, but it is, of course, to be understood that any type of draft mechanism may be employed for the attachment of one or more draft animals to draw the apparatus from place to place in the field or between the field and barn as occasion may require.

Pivotally mounted upon the outer ends of the rear rod or tie bolt 4 are arms 5, carrying at their forward ends the pitching fork 6, which may be of any preferred construction. These arms are adapted to swing down close to the ground to allow the hay to be elevated to be gathered, and then to be swung upwardly for the elevation of the hay upon the fork. To the forward ends of said bars, which extend a sufficient distance beyond the runners 1 when in lowered position, are attached cords or cables 7, which are connected with a hoisting rope or cable 8 extending around a pulley 9 on the rear cross-bar 3. This rope may be of any desired length, and is adapted to be manipulated by hand or animal power to raise and lower the fork. The cables 7 pass through a pulley block 10 upon the vertex or upper end of an inverted V-shaped guide frame 11, which frame is pivotally mounted at its lower end upon the forward rod or bolt 4 and is adapted when the apparatus is not in use to fold down between the sills 1.

The rear cross-bar 3 extends at each end beyond the sills and forms the base of what, for convenience, shall be termed the vertical rear wall 12 of a stack frame or inclosure, which wall is formed by vertical standards 13 rising from the sills and connected at their upper ends to a cross-bar or strip 14, and a series of spaced rods or wires 15 connected with the bars 3 and 14, the standards 13 being reinforced from the sills or runners by inclined braces 16, thus forming a wall which is comparatively light in weight and yet of comparatively great strength.

In addition to the wall 12, the stack inclosure or frame includes two side walls 17 and 18 of generally similar construction to said wall 12, and having their top and bottom bars connected at one end with the ends of the bars 3 and 14 by hinges 19, thus allowing said walls 17 and 18 to be swung either forwardly or rearwardly. To the opposite ends of the walls 17 and 18 are hinged, as at 20, a pair of gate sections 21 and 22, which also conform in general construction with the respective walls. These gate sections are coextensive in width and are provided at their meeting edges with suitable means for connecting them when the parts are arranged to form the stack frame or inclosure, as shown in Fig. 1, such means comprising in the present instance a hook 23 upon one gate section adapted to engage an eye 24 upon the other gate section.

The operation of arranging the walls to form the stack frame or inclosure will be clearly understood by reference to Fig. 1, from which it will be seen that the walls 17 and 18 are swung rearwardly, and that the gate sections 21 and 22 are swung inwardly and close the side of the frame opposite the wall 12. By this means a frame of substantially rectangular form and open at the top to allow the hay to be pitched thereinto by the fork 6 is provided. Folding legs 25 are carried by the side wall 17 and are adapted to be downturned to support the outer ends of the frame upon the ground when the frame is set up, as shown. The operation of manipulating the rack to pitch the hay into the frame until a stack of the desired size is formed will be apparent, and it will be seen that the construction described affords increased convenience in this respect.

When it is desired to transport the device after the formation of one stack to another place for the formation of a second stack, the gate sections 21 and 22 are disconnected, folded back upon the side walls 17 and 18, to which they may be temporarily secured in any preferred manner, then said side walls 17 and 18, with the legs 25 turned up out of operative position, are swung forwardly to lie at an angle as shown in Fig. 2 and rest upon the forward ends of the sills 1, by which the stack frame or inclosure will be folded in conveniently close compass to allow the apparatus to be transported with facility. It will be understood, of course, that before the rack is folded the frame 11 is turned down between the sills and the fork frame elevated to a vertical position and held in such position by tying the cable 8 temporarily to some portion of the frame during the period of transportation.

From the foregoing description, the improved construction, mode of operation and advantages of my invention will be readily understood, and it will be seen that the manner of folding the frame allows the apparatus to be both stored and transported with ease and convenience.

Having thus fully described the invention, what is claimed as new is:—

1. A hay pitching and stacking apparatus comprising a carrier frame, a vertically swinging fork carried by said frame, a wall mounted transversely upon the rear end of the frame, side walls hinged at one end to said wall, gates hinged to the opposite ends of the side walls, said gates being provided with means for connecting them, whereby a folding stack frame or inclosure of rectangular form is provided, and folding legs carried by the side walls to support the outer ends thereof when arranged in frame-forming position.

2. A hay pitching and stacking apparatus comprising a carrier frame, a vertically swinging fork mounted thereon, and a stack frame comprising a vertical rear wall transversely disposed at the rear of the carrier frame, side walls hinged thereto to swing in either direction, gate sections hinged to the side walls to provide a connecting means, said walls and gates being adapted to be disposed to form a rectangular frame beyond the rear of the carrier frame, the gates being adapted to be folded against the side walls and the latter swung forwardly to rest upon the forward portion of the carrier frame.

3. A hay pitching and stacking apparatus comprising a raising frame, a vertically swinging fork mounted upon said frame, a vertical wall supported transversely upon the rear end of the runner frame adapted to form the front wall of a stack frame, side walls hinged to said front wall to swing forwardly or rearwardly, gate sections hinged at the opposite ends of the side wall to swing to a position parallel with said walls or parallel with the front wall to conjunctively form the rear wall of the complete rectangular stack frame, means for connecting the gate sections, and folding supporting legs upon the outer ends of the side walls, the construction being such that the gates and the side walls may be folded and swung forwardly to rest upon the sills of the runner frame, substantially as described.

In testimony whereof I affix my signature in presence of two witnesses.

EDWARD MURRAY.

Witnesses:
A. G. HUMPHREY,
JOHN H. WELTON